US009092248B1

(12) United States Patent
Makin et al.

(10) Patent No.: US 9,092,248 B1
(45) Date of Patent: Jul. 28, 2015

(54) SYSTEMS AND METHODS FOR RESTORING DISTRIBUTED APPLICATIONS WITHIN VIRTUAL DATA CENTERS

(71) Applicant: Symantec Corporation, Mountain View, CA (US)

(72) Inventors: Gaurav Makin, Roseville, MN (US); James Olson, Afton, MN (US); Sinh Nguyen, Eden Prairie, MN (US); John Kjell, Little Canada, MN (US)

(73) Assignee: Symantec Corporation, Mountain View, CA (US)

( * ) Notice: Subject to any disclaimer, the term of this patent is extended or adjusted under 35 U.S.C. 154(b) by 160 days.

(21) Appl. No.: 13/972,426

(22) Filed: Aug. 21, 2013

(51) Int. Cl.
   *G06F 9/455* (2006.01)
(52) U.S. Cl.
   CPC .................................. *G06F 9/45533* (2013.01)
(58) Field of Classification Search
   CPC ............ G06F 9/45533; G06F 11/1448; G06F 11/1458; G06F 11/1469; G06F 17/30076; G06F 17/30073
   See application file for complete search history.

(56) References Cited

U.S. PATENT DOCUMENTS

| | | | |
|---|---|---|---|
| 6,912,631 | B1 | 6/2005 | Kekre et al. |
| 6,931,558 | B1 | 8/2005 | Jeffe et al. |
| 7,024,527 | B1 | 4/2006 | Ohr |
| 7,093,086 | B1 | 8/2006 | van Rietschote |
| 7,194,487 | B1 | 3/2007 | Kekre et al. |
| 7,293,146 | B1 | 11/2007 | Kekre et al. |
| 7,356,679 | B1 | 4/2008 | Le et al. |
| 7,370,164 | B1 * | 5/2008 | Nagarkar et al. ............. 711/162 |
| 7,480,822 | B1 | 1/2009 | Arbon et al. |
| 7,552,358 | B1 | 6/2009 | Asgar-Deen et al. |
| 7,631,020 | B1 | 12/2009 | Wei et al. |
| 7,669,020 | B1 | 2/2010 | Shah |
| 7,721,138 | B1 * | 5/2010 | Lyadvinsky et al. ........... 714/4.1 |
| 7,797,281 | B1 | 9/2010 | Greene et al. |
| 7,805,631 | B2 | 9/2010 | Fries |
| 7,809,693 | B2 | 10/2010 | Lango et al. |

(Continued)

FOREIGN PATENT DOCUMENTS

EP      2234018      9/2010

OTHER PUBLICATIONS

Atul Akolkar et al.; Systems and Methods for Enhancing Virtual Machine Backup Image Data; U.S. Appl. No. 12/950,972, filed Nov. 19, 2010.

(Continued)

*Primary Examiner* — Van Nguyen
(74) *Attorney, Agent, or Firm* — ALG Intellectual Property, LLC

(57) ABSTRACT

A computer-implemented method for restoring distributed applications within virtual data centers may include (1) receiving a request to restore a distributed application that includes at least one virtual machine to a virtual data center, (2) identifying a backup of the virtual machine stored within backup storage, (3) exposing the backup of the virtual machine stored within the backup storage to a hypervisor, (4) regenerating the virtual machine by accessing the backup of the virtual machine at the backup storage, (5) adding the virtual machine to the distributed application, and (6) restoring, before completely recovering the virtual machine from the backup storage to the datastore of the virtual data center, the distributed application by starting the virtual machine as part of the distributed application. Various other methods, systems, and computer-readable media are also disclosed.

20 Claims, 6 Drawing Sheets

(56) References Cited

U.S. PATENT DOCUMENTS

| | | | |
|---|---|---|---|
| 7,827,150 B1 | 11/2010 | Wu et al. | |
| 7,831,550 B1 | 11/2010 | Pande et al. | |
| 7,831,682 B2* | 11/2010 | Certain et al. | 709/214 |
| 7,831,861 B1 | 11/2010 | Greene et al. | |
| 7,937,545 B1 | 5/2011 | Wu et al. | |
| 7,937,547 B2 | 5/2011 | Liu et al. | |
| 8,001,342 B2* | 8/2011 | Armstrong et al. | 711/162 |
| 8,019,732 B2 | 9/2011 | Paterson-Jones et al. | |
| 8,046,550 B2* | 10/2011 | Feathergill | 711/162 |
| 8,060,476 B1 | 11/2011 | Afonso et al. | |
| 8,099,391 B1 | 1/2012 | Monckton | |
| 8,117,168 B1 | 2/2012 | Stringham | |
| 8,135,748 B2 | 3/2012 | Rosikiewicz et al. | |
| 8,140,906 B1 | 3/2012 | Searls et al. | |
| 8,161,321 B2 | 4/2012 | Zheng et al. | |
| 8,185,505 B1 | 5/2012 | Blitzer et al. | |
| 8,205,050 B2* | 6/2012 | De Baer et al. | 711/162 |
| 8,209,290 B1 | 6/2012 | Dowers, II et al. | |
| 8,209,680 B1 | 6/2012 | Le et al. | |
| 8,219,769 B1 | 7/2012 | Wilk | |
| 8,230,187 B1 | 7/2012 | Krinke, II et al. | |
| 8,239,646 B2 | 8/2012 | Colbert et al. | |
| 8,290,912 B1 | 10/2012 | Searls et al. | |
| 8,307,177 B2 | 11/2012 | Prahlad et al. | |
| 8,315,983 B1 | 11/2012 | Sumant et al. | |
| 8,315,986 B1 | 11/2012 | Kapoor et al. | |
| 8,332,689 B2 | 12/2012 | Timashev et al. | |
| 8,346,726 B2* | 1/2013 | Liu et al. | 707/640 |
| 8,346,727 B1 | 1/2013 | Chester et al. | |
| 8,346,891 B2 | 1/2013 | Safari et al. | |
| 8,355,407 B2 | 1/2013 | Wookey et al. | |
| 8,386,733 B1 | 2/2013 | Tsaur et al. | |
| 8,402,309 B2 | 3/2013 | Timashev et al. | |
| 8,438,349 B2* | 5/2013 | Olson et al. | 711/162 |
| 8,443,166 B2 | 5/2013 | Czezatke et al. | |
| 8,464,254 B1 | 6/2013 | Vohra et al. | |
| 8,473,463 B1 | 6/2013 | Wilk | |
| 8,489,552 B1 | 7/2013 | Dowers, II et al. | |
| 8,489,830 B2 | 7/2013 | Wu et al. | |
| 8,510,271 B1 | 8/2013 | Tsaur et al. | |
| 8,527,990 B1 | 9/2013 | Marathe et al. | |
| 8,555,009 B1 | 10/2013 | Majahan et al. | |
| 8,565,545 B1 | 10/2013 | Syed et al. | |
| 8,566,640 B2* | 10/2013 | Timashev et al. | 714/15 |
| 2007/0043860 A1 | 2/2007 | Pabari | |
| 2008/0243953 A1 | 10/2008 | Wu et al. | |
| 2009/0249284 A1 | 10/2009 | Antosz et al. | |
| 2009/0313447 A1 | 12/2009 | Nguyen et al. | |
| 2010/0058106 A1 | 3/2010 | Srinivasan et al. | |
| 2010/0077137 A1 | 3/2010 | Soemo et al. | |
| 2010/0107158 A1 | 4/2010 | Chen et al. | |
| 2010/0115332 A1 | 5/2010 | Zheng et al. | |
| 2010/0169592 A1 | 7/2010 | Atluri | |
| 2010/0262586 A1 | 10/2010 | Rosikiewicz et al. | |
| 2010/0268568 A1 | 10/2010 | Ochs et al. | |
| 2011/0119462 A1 | 5/2011 | Leach et al. | |
| 2011/0173405 A1 | 7/2011 | Grabarnik et al. | |
| 2011/0276539 A1 | 11/2011 | Thiam | |
| 2012/0017114 A1 | 1/2012 | Timashev et al. | |
| 2012/0109897 A1 | 5/2012 | Janakiraman et al. | |
| 2012/0151273 A1 | 6/2012 | Ben Or et al. | |
| 2013/0091334 A1* | 4/2013 | Yu et al. | 711/162 |
| 2013/0173771 A1* | 7/2013 | Ditto et al. | 709/223 |
| 2013/0173780 A1* | 7/2013 | Ditto et al. | 709/224 |
| 2014/0067763 A1 | 3/2014 | Jorapurkar et al. | |
| 2014/0082166 A1* | 3/2014 | Robinson et al. | 709/223 |

OTHER PUBLICATIONS

Shailesh Vaman Marathe et al.; Systems and Methods for Migrating Virtual Machines, U.S. Appl. No. 13/097,635, filed Apr. 29, 2011.

Deb Banerjee; Systems and Methods for Workload Security in Virtual Data Centers; U.S. Appl. No. 13/291,716, filed Nov. 8, 2011.

Subash Rajaa et al.; Systems and Methods for Facilitating Substantially Continuous Availability of Multi-Tier Applications Within Computer Clusters; U.S. Appl. No. 13/524,367, filed Jun. 15, 2012.

Chuck Subjan et al.; Systems and Methods for Enabling Virtual Environments to Mount Non-Native Storage Disks; U.S. Appl. No. 13/863,886, filed Apr. 16, 2013.

Gaurav Makin et al.; Systems and Methods for Instantly Restoring Virtual Machines in High Input/Output Load Environments; U.S. Appl. No. 13/944,507, filed Jul. 17, 2013.

Amit Haridas Rangari et al.; Systems and Methods for Enabling Migratory Virtual Machines to Expedite Access to Resources; U.S. Appl. No. 13/928,340, filed Jun. 26, 2013.

Deb Banerjee; Systems and Methods for Enforcing Secure Network Segmentation for Sensitive Workloads; U.S. Appl. No. 13/945,373, filed Jul. 18, 2013.

Atul Khandelwal et al.; Systems and Methods for Managing Virtual Machine Backups; U.S. Appl. No. 13/954,602, filed Jul. 30, 2013.

Manning, Paul, "Best Practices for running VMware vSphere on Network Attached Storage", http://www.vmware.com/files/pdf/techpaper/VMware-NFS-BestPractices-WP-EN.pdf, as accessed on Oct. 8, 2014, White Paper, VMware,(May 19, 2010).

"vSphere Storage—ESXi 5.0, vCenter Server 5.0", http://pubs.vmware.com/vsphere-50/topic/com.vmware.ICbase/PDF/vsphere-esxi-vcenter-server-50-storage-guide.pdf, as accessed on Oct. 8, 2014, VMware, Inc., (Nov. 8, 2011).

"Symantec NetBackup for VMware Administrator's Guide—Release 7.5", http://kbdownload.symantec.com/resources/sites/BUSINESS/content/live/DOCUMENTATION/5000/DOC5162/en_US/NetBackup7.5_AdminGuide_VMware.pdf?_gda_= 1411393770_c2402ef79d42f0c9f8c7a29f0e476017, as accessed on Oct. 8, 2014, Symantec Corporation, (Jan. 12, 2012).

Subash Rajaa, et al; Systems and Methods for Managing Multipathing Configurations for Virtual Machines; U.S. Appl. No. 13/548,195, filed Jul. 12, 2012.

Subash Rajaa; Systems and Methods for Managing Affinity Rules in Virtual-Machine Environments; U.S. Appl. No. 13/686,330, filed Nov. 27, 2012.

Davies, Alex, "NetBackup Disk Based Date Protection Options", Symantec Corporation, (Oct. 2007).

Xianbo Zhang, et al.; Systems and Methods for Prefetching Subsequent Data Segments; U.S. Appl. No. 13/961,685, filed Aug. 7, 2013.

"How to configure and use Exchange Granular Restore in NetBackup 6.5.3 and Later.", Symantec Corporation; Article ID: TECH66342, (Jan. 29, 2008).

"Symantec Declares Deduplication Everywhere", Symantec Corporation; Press Release,(Jul. 7, 2009).

Simpson, Dave "PHD Virtual Improves VM Backups", Infostor, vol. 13, No. 6, (Jun. 1, 2009).

"Arkeia Delivers New vStorage-based Backup Agent for VMWare", PR Newswire, (Jun. 30, 2010).

"CA Inc: CA Delivers Comprehensive Recovery Management to Support Data Storage, Backup and Recovery; New Releases of CA ARCserve Backup and CA XOsoft Leverage Virtualization, Data Deduplication, Storage Resource Management and DR Testing to Support Lean IT", M2 PressWIRE, (Apr. 27, 2009).

Komiega, Kevin "Symantec to expand deduplication.", Infostor, vol. 13, No. 8, (Aug. 1, 2009).

"Customer FAQ—Symantec Backup Exec 12.5 for Windows Servers and Symantec Backup Exec System Recovery 8.5", Symantec Corporation, (Aug. 2008).

Fegreus, Jack "Analysis: Minimizing System Risk via End-to-End Backup and Recovery Process Automation", openBench Labs, (Sep. 10, 2009).

"Complete Data Protection for VMWare Virtual Environments", Hewlett-Packard, ESG Research Report, ESG IT Infrastructure and Service Management Survey, (Mar. 2008).

"Symantec NetBackup for VMWare Administrator's Guide, UNIX, Windows, and Linux, Release 7.0.1", Symantec Corporation, (2010).

"Symantec NetBackup Administrator's Guide, vol. 1, UNIX and Linux, Release 7.0.1", Symantec Corporation, (2010).

"File Level Restore, VMware Data Recovery 1.0", VMware, Inc., (2009).

"Administration Guide, Site Recovery Manager 1.0 Update 1", VMware, Inc., (2008).

(56) References Cited

OTHER PUBLICATIONS

"vSphere Web Services SDK Programming Guide, vSphere Web Services SDK 4.0", VMware, Inc., (2009).

"vSphere Basic System Administration, vCenter Server 4.0, ESX 4.0, ESXi 4.0", VMware, Inc., (2009-2011).

"Optimized Backup and Recovery for VMware Infrastructure with EMC Avamar", VMware, Inc., White Paper, (2007).

"Symantec NetBackup PureDisk Getting Started Guide, Windows Linux, and UNIX, Release 6.6, Publication release 6.6, revision 2", Symantec Corporation, (2009).

"Veeam Backup & Replication v5 Preview - SureBackup, U-AIR and Instant VM Recovery", http://www.veeam.com/blog/veeam-backup-replication-v5-preview-surebackup-u-air-and-instant-vm-recovery.html, (Aug. 15, 2010).

Gostev, Anton "Migration (VMware: [FAQ] Frequently Asked Questions)", http://forums.veeam.com/viewtopic.php?f=24&t=9329#p39955, Veeam Community Forums, (Nov. 2011).

Arts, Henk "Veeam Backup and Replication v5", http://www.slideshare.net/henkarts/veeam-backup-and-replication-v5, Veeam Software Inc., (Nov. 1, 2010).

Hazelman, Doug "vPower Demo: Instant VM Recovery, U-AIR, Instant File-Level Restore", http://www.youtube.com/watch?v=zbZMsk2Prgw, (Jan. 28, 2011).

"Veeam Backup & Replication 5.0: User Guide", http://www.veeam.com/files/guide/veeam_backup_5_0_user_guide.pdf, Veeam Software Inc., (Oct. 2010).

Paul, Justin "Veeam vPower Instant Recovery", http://jpaul.me/?p=1425, Justin's ITBlog, (Mar. 24, 2011).

Makin, Gaurav et al., "Method to Reduce the RTO of an Application by Running the Application Directly from its Backup Image in a Virtualization Environment", http://ip.com/IPCOM/000217035, Symantec Corporation, (Apr. 27, 2012).

"Veeam Backup & Replication: What's New in v6", http://www.vmc-company.ru/pdf/veeam/veeam_backup_6_0_whats_new.pdf, Veeam Software Inc., (Nov. 18, 2011).

Ravindra Teli, et al.; Optimized Restore of Virtual Machine and Virtual Disk Data; U.S. Appl. No. 13/661,258, filed Oct. 26, 2012.

* cited by examiner

SYSTEMS AND METHODS FOR RESTORING DISTRIBUTED APPLICATIONS WITHIN VIRTUAL DATA CENTERS

BACKGROUND

Today, individuals and organizations increasingly rely on virtualization technologies to simplify management of their IT infrastructures. Typical virtualization technologies may enable multiple virtual servers to concurrently run on the same physical host, which may reduce the number of physical computing devices that must be managed and maintained. Some virtualization technologies may also enable virtual resources from one or more physical devices to be partitioned into one or more virtual data centers and/or may enable one or more virtual machines to be configured and/or managed within a virtual data center as part of a single distributed application, which may reduce the complexity of managing certain applications (e.g., multi-tiered applications).

Unfortunately, conventional techniques for backing up and restoring distributed applications within virtual data centers may present unwanted limitations. For example in the event that a distributed application fails while running within a virtual data center, a typical method for restoring the distributed application to the virtual data center may include transferring a backup of each virtual machine that is part of the distributed application from a backup storage system to a production datastore accessible to the virtual data center before the distributed application can be brought online, which may take a considerable amount of time and as a result may negatively impact recovery time objectives. Accordingly, the instant disclosure identifies a need for additional and improved systems and methods for restoring distributed applications within virtual data centers.

SUMMARY

As will be described in greater detail below, the instant disclosure generally relates to systems and methods for restoring distributed applications within virtual data centers. In one example, a computer-implemented method for restoring distributed applications within virtual data centers may include (1) receiving a request to restore a distributed application that includes at least one virtual machine to a virtual data center, (2) identifying a backup of the virtual machine stored within backup storage, (3) exposing the backup of the virtual machine stored within the backup storage to a hypervisor that is capable of providing at least one processing resource to the virtual data center, (4) regenerating the virtual machine by accessing the backup of the virtual machine at the backup storage, (5) adding the virtual machine to the distributed application, and (6) restoring, before completely recovering the virtual machine (e.g., the virtual machine's configuration files and virtual-disk files) from the backup storage to a datastore of the virtual data center, the distributed application by starting the virtual machine as part of the distributed application.

In some examples, the computer-implemented method for restoring distributed applications within virtual data centers may further include recovering the virtual machine from the backup storage to the datastore of the virtual data center by migrating the virtual machine (e.g., the virtual machine's configuration files and/or virtual-disk files) from the backup storage to the datastore of the virtual data center.

In some examples, the computer-implemented method for restoring distributed applications within virtual data centers may further include (1) determining, in response to receiving the request to restore the distributed application to the virtual data center, that the processing resource from the hypervisor is or is capable of being allocated to the virtual data center and (2) selecting, based at least in part on determining that the processing resource from the hypervisor is or is capable of being allocated to the virtual data center, the hypervisor on which to start the virtual machine.

In some examples, the virtual data center may include a tenant-level virtual data center, and the step of determining that the processing resource from the hypervisor is capable of being allocated to the virtual data center may include (1) identifying a provider-level virtual data center that hosts the tenant-level virtual data center and (2) determining that the processing resource is allocated to the provider-level virtual data center.

In some examples, the step of exposing the backup of the virtual machine stored within the backup storage to the hypervisor may include mounting the backup of the virtual machine stored within the backup storage to the hypervisor as part of an additional datastore. In some examples, the additional datastore may include a network-file-system datastore or a virtual-machine-file-system datastore.

In some examples, the computer-implemented method for restoring distributed applications within virtual data centers may further include allocating the additional datastore to the virtual data center and/or a provider-level virtual data center that hosts the virtual data center.

In some examples, the step of identifying the backup of the virtual machine stored within the backup storage may include (1) identifying configuration details of the distributed application, (2) determining, based at least in part on the configuration details of the distributed application, that the distributed application includes the virtual machine, and (3) determining that the virtual machine has been backed up to the backup storage.

In some examples, the request to restore the distributed application to a virtual data center may include a request to completely restore the distributed application (e.g., as a result of a failure of the distributed application), and the step of adding the virtual machine to the distributed application may include regenerating the distributed application. In other examples, the request to restore the distributed application to the virtual data center may include a request to restore a virtual machine to the distributed application (e.g., as a result of a failure of the virtual machine).

In some examples, the step of restoring the distributed application by starting the virtual machine as part of the distributed application may include starting the distributed application before completely recovering the virtual machine from the backup storage to the datastore of the virtual data center.

In some examples, the distributed application may include a plurality of virtual machines and configuration details that indicate a boot order in which to start each virtual machine within the plurality of virtual machines, and the step of restoring the distributed application by starting the virtual machine as part of the distributed application may include starting, before completely recovering each virtual machine within the plurality of virtual machines from the backup storage to the datastore of the virtual data center, each virtual machine within the plurality of virtual machines according to the boot order.

In some examples, the computer-implemented method for restoring distributed applications within virtual data centers may further include backing up the distributed application by (1) backing up the virtual machine to the backup storage and (2) backing up configuration details of the distributed application to the backup storage. In some examples, the backup of the virtual machine may include a snapshot of the datastore.

In some examples, the distributed application may represent a multi-tiered application and/or a logical entity for independently managing a processing resource allocated to the distributed application, a storage resource allocated to the distributed application, a network resource allocated to the distributed application, and/or the virtual machine. In some examples, the distributed application may include two or more virtual machines.

In some examples, the computer-implemented method for restoring distributed applications within virtual data centers may further include recovering at least one file from the virtual machine before completely recovering the virtual machine from the backup storage to the datastore of the virtual data center.

In one embodiment, a system for implementing the above-described method may include (1) a receiving module that receives a request to restore a distributed application that includes at least one virtual machine to a virtual data center, (2) an identifying module that identifies a backup of the virtual machine stored within backup storage, (3) an exposing module that exposes the backup of the virtual machine stored within the backup storage to a hypervisor that is or is capable of providing at least one processing resource to the virtual data center, (4) a regenerating module that regenerates the virtual machine by accessing the backup of the virtual machine at the backup storage, (5) an adding module that adds the virtual machine to the distributed application, (6) a restoring module that restores, before completely recovering the virtual machine from the backup storage to the datastore of the virtual data center, the distributed application by starting the virtual machine as part of the distributed application, and (7) at least one processor that executes the receiving module, the identifying module, the exposing module, the regenerating module, the adding module, and the restoring module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request to restore a distributed application that includes at least one virtual machine to a virtual data center, (2) identify a backup of the virtual machine stored within backup storage, (3) expose the backup of the virtual machine stored within the backup storage to a hypervisor that is capable of providing at least one processing resource to the virtual data center, (4) regenerate the virtual machine by accessing the backup of the virtual machine at the backup storage, (5) add the virtual machine to the distributed application, and (6) restore, before completely recovering the virtual machine from the backup storage to the datastore of the virtual data center, the distributed application by starting the virtual machine as part of the distributed application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
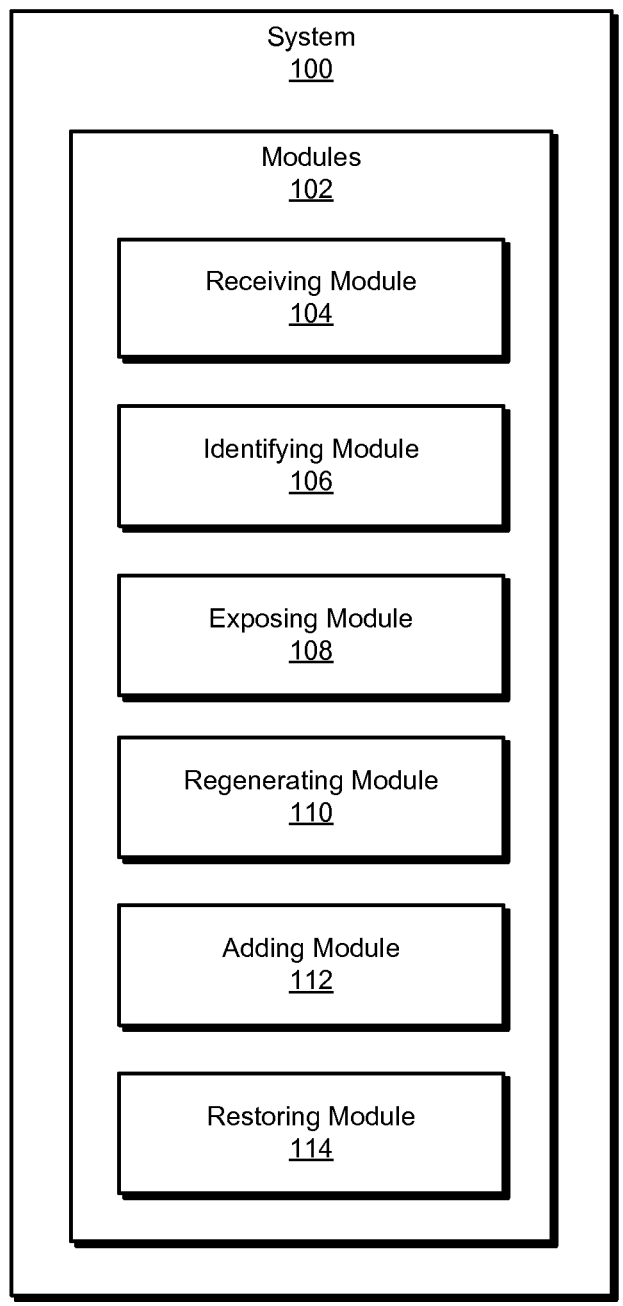
FIG. 1 is a block diagram of an exemplary system for restoring distributed applications within virtual data centers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for restoring distributed applications within virtual data centers. As will be explained in greater detail below, by restoring a distributed application to a virtual data center before the distributed application's virtual machines (e.g., the virtual machines' configuration files and virtual-disk files) have been completely recovered from backup storage to the virtual data center's production datastores, the systems and methods described herein may instantly restore all or a portion of the distributed application. Embodiments of the instant disclosure may also provide various other advantages and features, as discussed in greater detail below.

Figure 2:
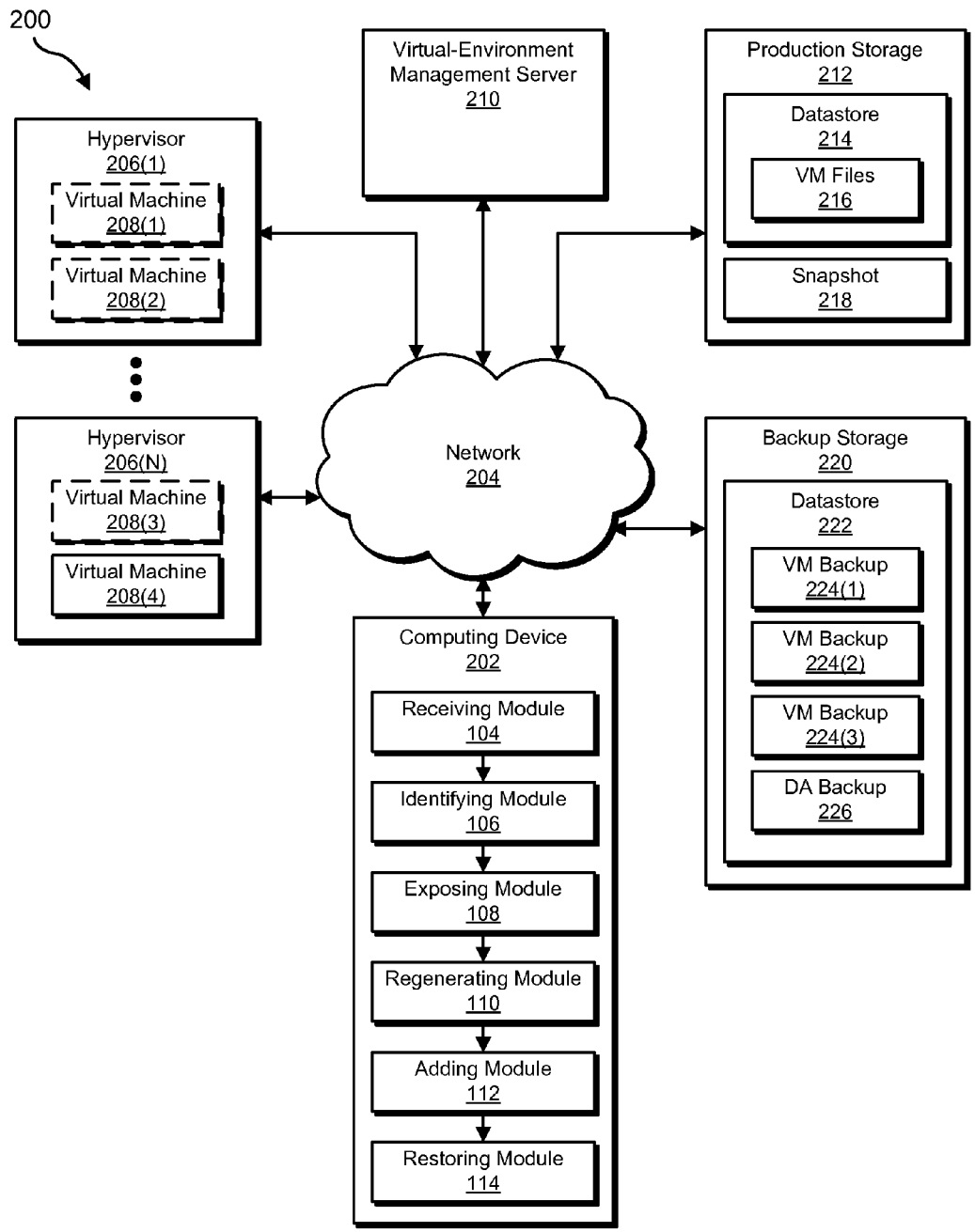
FIG. 2 is a block diagram of an exemplary system for restoring distributed applications within virtual data centers.

The following will provide, with reference to FIGS. 1 and 2, detailed descriptions of exemplary systems for restoring distributed applications within virtual data centers. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for restoring distributed applications within virtual data centers. As illustrated in this figure, exemplary system 100 may include one or more modules 102 for performing one or more tasks. For example, and as will be explained in greater detail below, exemplary system 100 may include a receiving module 104 that receives a request to restore a distributed application to a virtual data center. Exemplary system 100 may also include an identifying module 106 that identifies a backup of the virtual machine stored within backup storage. Exemplary system 100 may further include an exposing module 108 that exposes the backup of the virtual machine stored within the backup storage to a hypervisor that is or is capable of providing processing resources to the virtual data center.

In addition, and as will be described in greater detail below, exemplary system 100 may include a regenerating module 110 that regenerates the virtual machine by accessing the backup of the virtual machine at the backup storage. Exemplary system 100 may also include an adding module 112 that adds the virtual machine to the distributed application. Exemplary system 100 may further include a restoring module 114 that restores, before completely recovering the virtual machine from the backup storage to the datastore of the virtual data center, the distributed application by starting the virtual machine as part of the distributed application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, hypervisors 206(1)-(N), and/or virtual-environment management server 210), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Although illustrated as separate elements, one or more of modules 102 in FIG. 1 may represent portions of a single module or application (such as SYMANTEC BACKUP EXEC, SYMANTEC NETBACKUP, SYMANTEC V-RAY, VMWARE VSPHERE, VMWARE VCLOUD, VMWARE FUSION, VMWARE WORKSTATION, VMWARE HORIZON VIEW, VMWARE VCENTER OPERATIONS MANAGEMENT SUITE, XENSERVER, CLOUDPLATFORM, CLOUDPORTAL, XENDESKTOP, XENAPP, XENCLIENT, VDI-IN-A-BOX, ORACLE VM SERVER, ORACLE VM VIRTUAL BOX, ORACLE DESKTOP VIRTUALIZATION, MIRCROSOFT HYPER-V SERVER, and/or a single virtual machine). In at least one example, one or more of module 102 in FIG. 1 may represent portions of a single module or application that backs up and/or restores distributed applications.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202, hypervisors 206(1)-(N), a virtual-environment management server 210, a production storage system 212, and a backup storage system 220 in communication via a network 204. In some examples, computing device 202 may be programmed with one or more of modules 102. Additionally or alternatively, hypervisors 206(1)-(N) and/or virtual-environment management server 210 may be programmed with one or more of modules 102.

In one embodiment, one or more of modules 102 from FIG. 1 may, when executed by at least one processor of computing device 202, hypervisors 206(1)-(N), and/or virtual-environment management server 210, facilitate computing device 202, hypervisors 206(1)-(N), and/or virtual-environment management server 210 in restoring distributed applications within virtual data centers. For example, and as will be described in greater detail below, one or more of modules 102 may cause computing device 202, hypervisors 206(1)-(N), and/or virtual-environment management server 210 to (1) receive a request to restore a distributed application that includes at least one virtual machine (e.g., one or more of virtual machines 208(1)-(4)) to a virtual data center (e.g., a virtual data center that includes resources allocated from one or more of hypervisors 206(1)-(N)), (2) identify a backup (e.g., one of VM backups 224(1)-(3) or snapshot 218) of the virtual machine stored within backup storage (e.g., snapshot 218 or backup storage system 220), (3) expose the backup of the virtual machine stored within the backup storage to a hypervisor (e.g., one of hypervisors 206(1)-(N)) that is or is capable of providing at least one processing resource to the virtual data center, (4) regenerate the virtual machine by accessing the backup of the virtual machine at the backup storage, (5) add the virtual machine to the distributed application, and (6) restore, before completely recovering the virtual machine from the backup storage to a datastore (e.g., datastore 214) of the virtual data center, the distributed application by starting the virtual machine as part of the distributed application.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, hypervisors, virtual machines, combinations of one or more of the same, exemplary computing system 510 in FIG. 5, or any other suitable computing device. In at least one example, computing device 202 may represent a portion of a system configured to back up and/or restore distributed applications and virtual machines within virtual data centers.

Hypervisors 206(1)-(N) generally represent any type or form of virtualization platform capable of running and/or managing multiple virtual machines on a single physical computing device. Examples of hypervisors include, without limitation, VMWARE ESX/ESXI, MICROSOFT HYPER-V, ORACLE VM, SUN VIRTUALBOX, CITRIX XENSERVER, any bare-metal hypervisor, and/or any hosted hypervisor. Virtual machines 208(1)-(4) generally represent any virtualization (including hardware-assisted virtualization), implementation, or emulation of a physical computing device. In one example, virtual machines 208(1)-(4) may represent virtual machines configured to run one or more applications as part of one or more distributed applications.

Virtual-environment management server 210 generally represents any type or form of computing device capable of reading computer-executable instructions and/or managing virtual environments (e.g., distributed applications, virtual machines, virtual and/or physical resources, hypervisors, and/or virtual data centers). In some example, virtual-environment management server 210 may represent a computing device configured to manage hypervisors 206(1)-(N), virtual machines 208(1)-(4), production storage system 212, datastore 214, VM files 216, and snapshot 218. Virtual-environment management server 210 may also represent a computing device configured to manage resources 402, provider-level virtual data center 404, tenant-level virtual data centers 406(1) and 406(2), distributed applications 408(1)-(3), and virtual machine 410.

Figure 5:
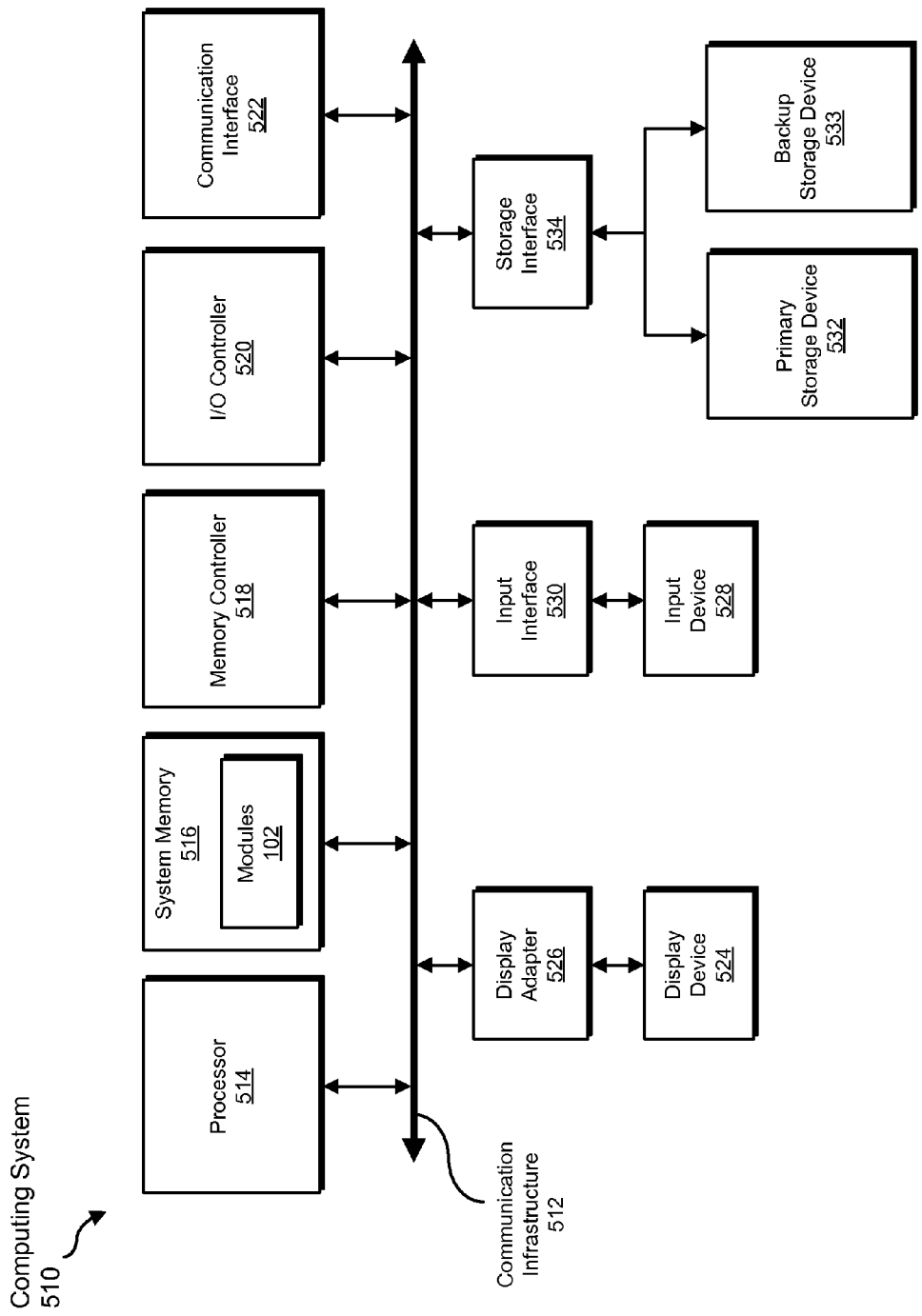
FIG. 5 is a block diagram of an exemplary computing system capable of implementing one or more of the embodiments described and/or illustrated herein.

Examples of virtual-environment management server 210 include, without limitation, laptops, tablets, desktops, servers, cellular phones, Personal Digital Assistants (PDAs), multimedia players, embedded systems, hypervisors, virtual machines, combinations of one or more of the same, exemplary computing system 510 in FIG. 5, or any other suitable computing device. Examples of virtual environments that may be managed by virtual-environment management server 210 may include, without limitation, VMWARE virtual environments (such as VMWARE VSPHERE, VMWARE VCLOUD, VMWARE FUSION, VMWARE WORKSTATION, VMWARE HORIZON VIEW, and/or VMWARE VCENTER OPERATIONS MANAGEMENT SUITE), CITRIX virtual environments (such as XENSERVER, CLOUDPLATFORM, CLOUDPORTAL, XENDESKTOP, XENAPP, XENCLIENT, and/or VDI-IN-A-BOX), ORACLE virtual environments (such as ORACLE VM SERVER, ORACLE VM VIRTUAL BOX, and/or ORACLE DESKTOP VIRTUALIZATION), MICROSOFT virtual environments (such as MIRCROSOFT HYPER-V SERVER), and/or any other suitable virtual environment. In at least one example, virtual-environment management server 210 may represent a VMWARE VCENTER SERVER and/or a VMWARE VCLOUD DIRECTOR SERVER.

Production storage system 212 may represent portions of a single storage device or a plurality of storage devices capable of storing distributed applications and/or virtual machines. As shown if FIG. 2, production storage system 212 may include a datastore 214 and a snapshot 218. Datastore 214 may represent any logical storage unit and/or location suitable for storing and accessing data for distributed applications and/or virtual machines (e.g., virtual-machine (VM) files 216). Examples of files that a datastore may store include, without limitation, distributed-application configuration files, virtual-disk files, virtual-machine configuration files, and virtual-machine log files. VM files 216 may represent data of distributed applications 408(1) and 408(2) and/or virtual machines 208(1)-(4).

Snapshot 218 generally represents a consistent point-in-time image of a portion of production storage system 212. For example, snapshot 218 may represent an exact copy of a portion of production storage system 212 (e.g., all or a portion of datastore 214) at a specific point-in-time (such as the point-in-time at which snapshot 218 was created) and may be read from and/or written to as such. Examples of snapshot 218 may include, without limitation, volume-level snapshots (e.g., a point-in-time image of all or a portion of a volume) and file-level snapshots (e.g., a point-in-time image of all or a portion of a file system). In at least one example, snapshot 218 may represent a hardware snapshot (e.g., a snapshot created by a storage device, such as a storage array).

Backup storage system 220 generally represents portions of a single storage device or a plurality of storage devices capable of storing backup data. In some examples, backup storage system 220 may represent a portion of computing system 510 in FIG. 5 and/or portions of exemplary network architecture 600 in FIG. 6. As shown in FIG. 2, backup storage system 220 may include virtual-machine (VM) backups 224(1)-(3) and distributed-application (DA) backup 226. VM backups 224(1)-(3) generally represent any file and/or data structure that includes backed up data representing the contents and/or structure of a virtual machine. Likewise, DA backup 226 generally represents any file and/or data structure that includes backed up data representing the contents and/or structure of a distributed application. As will be explained in greater detail below, VM backups 224(1)-(3) and/or DA backup 226 may be exposed to a hypervisor as part of a datastore 222.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, hypervisors 206(1)-(N), virtual machines 208(1)-(4), virtual-environment management server 210, production storage system 212, and backup storage system 220.

Figure 3:
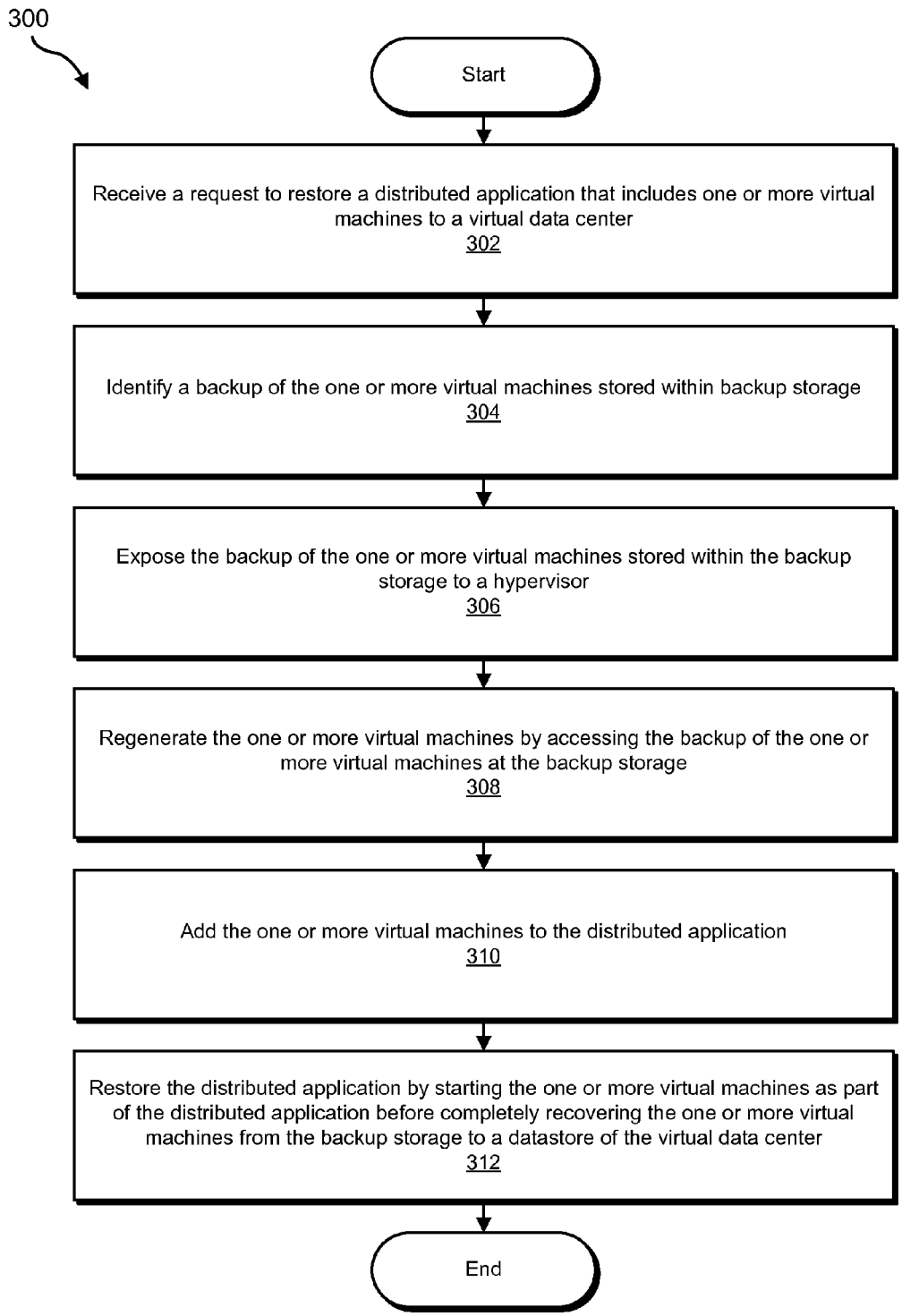
FIG. 3 is a flow diagram of an exemplary method for restoring distributed applications within virtual data centers.

FIG. 3 is a flow diagram of an exemplary computer-implemented method 300 for restoring distributed applications within virtual data centers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive a request to restore a distributed application that includes one or more virtual machines to a virtual data center. For example, at step 302 receiving module 104 may, as part of computing device 202 in FIG. 2, receive a request to restore distributed application 408(1) in FIG. 4 that includes virtual machines 208(1) and 208(3) and/or distributed application 408(2) in FIG. 4 that includes virtual machines 208(2) and 208(4) to tenant-level virtual data center 406(1) in FIG. 4.

As used herein, the term "distributed application" may generally refer to a logical entity used to configure, distribute, and/or manage an application or application stack within a virtual data center. A typical distributed application may contain one or more individual virtual machines, one or more individual distributed applications, one or more virtual infrastructure resources, and/or metadata that defines configuration and operational details of the distributed application. In at least one example, the term "distributed application" may refer to a VMWARE VAPP. As used herein, the phrase "virtual machine" generally refers to a computing-system platform that may not have direct correspondence to hardware of an underlying physical device and/or any data that defines the computing-system platform (e.g., configuration files and/or virtual-disk files). Hardware of a host system may be abstracted to a virtual machine using a hypervisor or other virtualization software. A virtual machine may run a guest operating system and/or various other software applications.

In some examples, the term "distributed application" may refer to a multi-tiered application made up of a collection of virtual machines. A multi-tiered distributed application may enable various functions of an application to be divided among disparate virtual machines that work together to form the application. An example of a multi-tiered distributed application may include a web application that includes a web-server tier, a database tier, and an application tier. In this example, each tier of the web application may run within separate and distinct virtual machines.

In some examples, the term "distributed application" may refer to a logical entity that enables various application components and virtual infrastructure resources to be configured and/or managed as a single unit. For example, a distributed application may be used to configure and/or manage, as a single unit, processing resources allocated to the distributed application, storage resources allocated to the distributed application, network resources allocated to the distributed application, and/or one or more virtual machines that are part of the distributed application. In one example, a distributed application's virtual machines may be started or stopped by simply starting or stopping the distributed application. In another example, a distributed application may be configured with a boot order in which to start the virtual machines that are part of the distributed application.

In some examples, the term "distributed application" may refer to a logical entity that enables various application components and/or virtual infrastructure resources to be isolated and/or protected. For example, a distributed application may include a network resource that is accessible to only certain components and/or virtual infrastructure resources that are part of the distributed application. In another example, a distributed application may be configured such that its application components and virtual infrastructure resources are or are not connected to network resources of the virtual data center within which the distributed application operates and/or other external networks (e.g., networks that connect to the Internet).

Distributed applications and/or virtual machines may execute within virtual data centers. As used herein, the term "virtual data center" generally refers to any system for providing access to pooled virtual infrastructure resources (e.g., processing, storage, and/or network resources) from one or more hypervisors, storage devices, and/or networking devices. Virtual machines within a virtual data center may be executed by processing resources of the virtual data center and may be stored within datastores that are accessible to the virtual data center.

As used herein, the term "processing resource" may generally refer to any central-processing resource of a hypervisor that is capable of executing a distributed application and its virtual machines. The term "hypervisor" generally refers to any type or form of virtualization platform capable of running and/or managing multiple virtual machines on a single physical computing device. The term "datastore," as used herein, generally refers to any logical storage unit and/or location suitable for storing and accessing distributed applications (e.g., distributed-application metadata) and/or virtual machines (e.g., virtual-disk files and/or virtual-machine configuration files).

In some examples, the term "virtual data center" may refer to a provider-level virtual data center that may include pooled virtual infrastructure resources from one or more hypervisors, storage devices, and/or networking devices (such as, e.g., a VMWARE PROVIDER VIRTUAL DATACENTER) and/or a tenant-level virtual data center that may include virtual infrastructure resources provisioned from a provider-level virtual data center (such as, e.g., a VMWARE VCLOUD ORGANIZATION VIRTUAL DATACENTER). Additional examples of virtual data centers may include, without limitation, cloud computing platforms and/or software-defined data centers.

Figure 4:
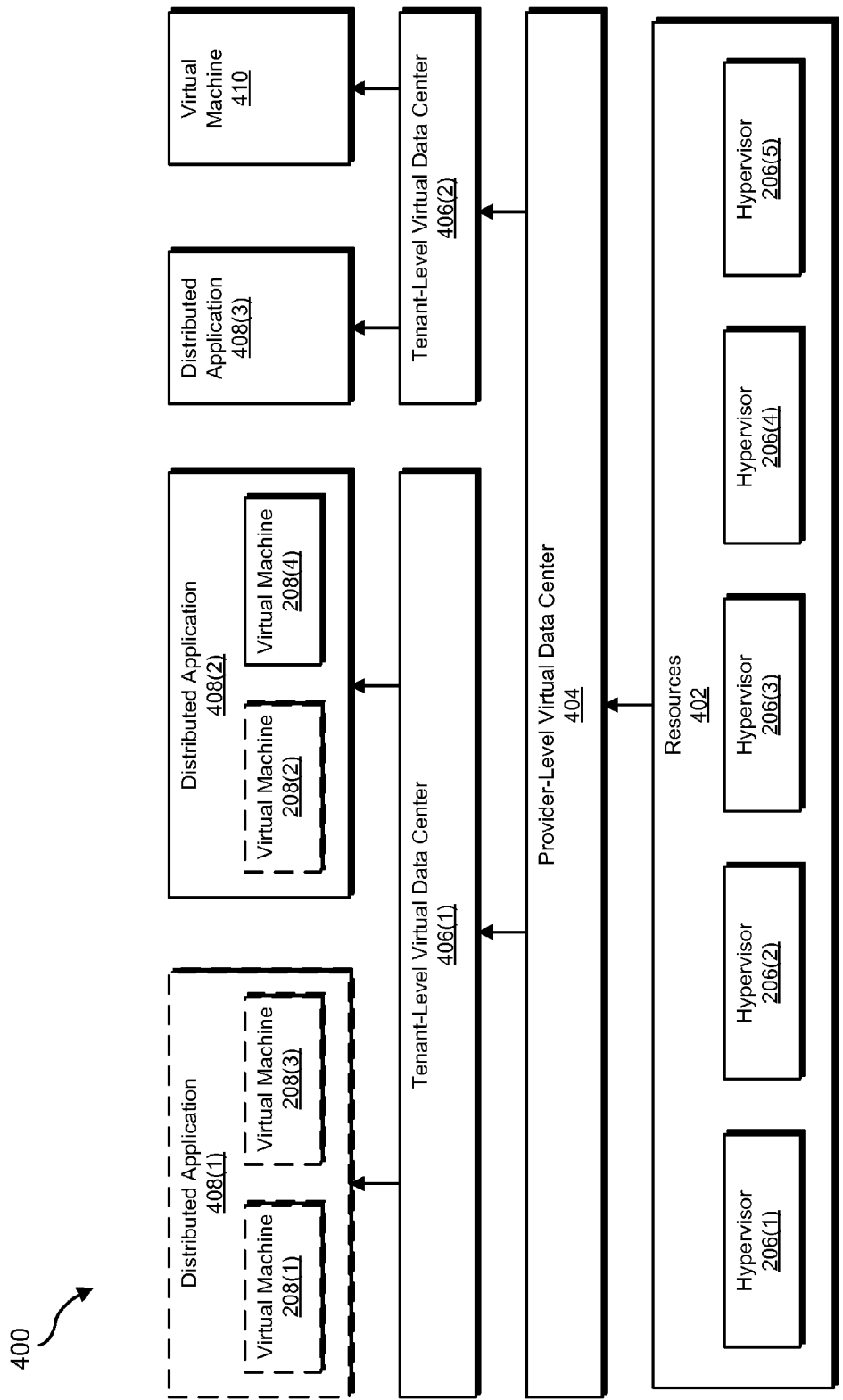
FIG. 4 is a block diagram of an exemplary virtual-data-center environment.

FIG. 4 is a block diagram of an exemplary virtual-data-center environment 400. As shown in FIG. 4, virtual-data-center environment 400 may include a provider-level virtual data center 404 provisioned from a pool of virtual infrastructure resources 402. In this example, provider-level virtual data center 404 may include processing and/or memory resources allocated from hypervisors 206(1)-(5). Although not illustrated in FIG. 4, virtual infrastructure resources 402 may also include one or more storage resources (e.g., one or more datastores, such as datastore 214) and/or one or more network resources.

Exemplary virtual-data-center environment 400 may also include a tenant-level virtual data center 406(1) and a tenant-level virtual data center 406(2) that have been provisioned from provider-level virtual data center 404. In this example, tenant-level virtual data center 406(1) and tenant-level virtual data center 406(2) may be provisioned with separate and distinct portions of virtual infrastructure resources 402. In addition, virtual infrastructure resources allocated to tenant-level virtual data center 406(1) may be isolated from those of tenant-level virtual data center 406(2), and virtual infrastructure resources allocated to tenant-level virtual data center 406(2) may be isolated from those of tenant-level virtual data center 406(1).

As shown in FIG. 4, tenant-level virtual data center 406(1) may include distributed applications 408(1) and 408(2), and tenant-level virtual data center 406(2) may include a distributed application 408(3) and a virtual machine 410. In some examples, distributed application 408(1) may represent a distributed application that has failed and that may be completely restored, and distributed application 408(2) may represent an existing distributed application that contains one failed virtual machine (e.g. virtual machine 208(2)) and that may be partially restored.

Returning to FIG. 3, the systems described herein may perform step 302 in any suitable manner. For example, receiving module 104 may receive a request to restore a distributed application by receiving a request to restore a distributed application that has failed (e.g., distributed application 408(1)), by receiving a request to restore a distributed application that has partially failed (e.g., distributed application 408(2)), by receiving a request to restore data (e.g., a file) from a backup of a distributed application or virtual machine that is part of the distributed application, by receiving a request to create a clone of a distributed application from a backup of the distributed application (e.g., for testing purposes), and/or by receiving any request that necessitates the restoration of a distributed application from a backup of the distributed application and/or from a backup of a virtual machine that is part of the distributed application.

In some examples, receiving module 104 may receive a request to restore a distributed application to a virtual data center by detecting or otherwise determining that the distributed application has completely or partially failed.

At step 304, one or more of the systems described herein may identify a backup of the one or more virtual machines stored within backup storage. For example, at step 304 identifying module 106 may, as part of computing device 202 in FIG. 2, identify VM backup 224(1) of virtual machine 208(1), VM backup 224(2) of virtual machine 208(2), and/or VM backup 224(3) of virtual machine 208(3) stored within backup storage system 220. In another example, identifying module 106 may identify a backup of one or more of virtual machines 208(1)-(3) stored within snapshot 218.

As used herein, the term "backup" generally refers to data that results from any procedure that backs up, duplicates, or protects distributed-application and/or virtual-machine data. For example, the term "backup" may refer to a copy of a distributed application (e.g., a copy of the distributed application's metadata) or a copy of a virtual machine (e.g., a copy of the virtual machine's virtual-disk files and/or configuration files) that may be used to restore the distributed application or the virtual machine. In at least one example, the term "backup" may refer to a snapshot (e.g., snapshot 218) that contains a point-in-time copy of a distributed application and/or virtual machine.

Backups of distributed applications and virtual machines may be stored within backup storage. As used herein, the term "backup storage" may generally refer to a portion of one or more storage devices configured to store backed up data. In some examples, backup storage may be isolated from production storage so that the data stored within the backup storage is protected in the event of a disaster scenario at the production storage location.

Returning to FIG. 3, the systems described herein may perform step 304 in any suitable manner. In one example, identifying module 106 may identify backups of a distributed application's virtual machines by (1) identifying what virtual machines are part of the distributed application and need to be restored and (2) locating a backup of each of the identified virtual machines. For example, identifying module 106 may identify backups for the virtual machines of distributed application 408(1) by (1) determining that virtual machines 208(1) and 208(3) are part of distributed application 408(1) and that both virtual machines 208(1) and 208(3) need to be restored in order to restore distributed application 408(1) and (2) locating VM backup 224(1) of virtual machine 208(1) and VM backup 224(3) of virtual machine 208(3) stored within backup storage system 220.

In some examples, the request received as part of step 302 may include an indication of the virtual machines that are to be restored as part of restoring a distributed application, and identifying module 106 may use this information to identify backups for the identified virtual machines. In other examples, identifying module 106 may determine what virtual machines are part of a distributed application by keeping track of which virtual machines are part of each distributed application running within a virtual data center.

Additionally or alternatively, identifying module 106 may determine what virtual machines are part of a distributed application by identifying backed up metadata of the distributed application that indicates what virtual machines are part of the distributed application. For example, identifying module 106 may determine what virtual machines are part of distributed application 408(1) by identifying backed up metadata of distributed application 408(1) (e.g., metadata backed up to DA backup 226) that indicates that virtual machines 208(1) and 208(3) are part of distributed application 408(1).

In at least one example, identifying module 106 may determine what virtual machines are part of a distributed application by querying the system that manages the distributed application. For example, identifying module 106 may determine what virtual machines are part of distributed application 408(1) by querying virtual-environment management server 210.

At step 306, one or more of the systems described herein may expose the backup of the one or more virtual machines stored within the backup storage to the hypervisor. For example, at step 306 exposing module 108 may, as part of computing device 202 in FIG. 2, expose VM backup 224(1) of virtual machine 208(1) and/or VM backup 224(2) of virtual machine 208(2) to hypervisor 206(1) and VM backup 224(3) of virtual machine 208(3) to hypervisor 206(N). In another example, exposing module 108 may expose a backup of one of virtual machines 208(1) and 208(2) stored within snapshot 218 to hypervisor 206(1) and/or a backup of virtual machine 208(3) stored within snapshot 218 to hypervisor 206(N).

The systems described herein may perform step 306 in any suitable manner. In one example, exposing module 108 may expose a backup of a virtual machine to a hypervisor by mounting the backup of the virtual machine to the hypervisor as part of a datastore. For example, exposing module 108 may expose VM backup 224(1) of virtual machine 208(1) stored within backup storage 220 to hypervisor 206(1) by mounting VM backup 224(1) of virtual machine 208(1) to hypervisor 206(1) as part of datastore 222.

As mentioned above, the term "datastore" generally refers to any logical storage unit and/or location suitable for storing and accessing data for distributed applications and/or virtual machines. Examples of datastores may include, without limitation, network-file-system (NFS) datastores and/or virtual-machine-file-system (VMFS) datastores. The terms "mount" and "mounting," as used herein, generally refer to the act of making a datastore accessible to a physical or virtual computing device.

In some situations, a distributed application may be configured such that two or more of its virtual machines must operate on separate hypervisors. In these situations, exposing module 108 may expose backups of these virtual machines to separate hypervisors as part of separate and distinct datastores. For example, exposing module 108 may expose VM backup 224(1) of virtual machine 208(1) to hypervisor 206(1) and VM backup 224(3) of virtual machine 208(3) to hypervisor 206(N) by mounting VM backup 224(1) of virtual machine 208(1) to hypervisor 206(1) as part of one datastore and by mounting VM backup 224(3) of virtual machine 208(3) to hypervisor 206(N) as part of a separate and distinct datastore.

In some examples, exposing module 108 may select a target hypervisor to which to expose a backup of a virtual machine based on what hypervisors are or are capable of hosting the virtual data center to which the distributed application containing the virtual machine is to be restored. For example, if the virtual data center to which a distributed application is to be restore is a tenant-level virtual data center, exposing module 108 may select a hypervisor to which to expose the backup of the virtual machine by identifying configuration details of the tenant-level virtual data center and/or the provider-level virtual data center that hosts the tenant-level virtual data center and by selecting a hypervisor whose processing resources have been allocated to the tenant-level virtual data center and/or the provider-level virtual data center. For example, exposing module 108 may determine, in response to receiving a request to restore distributed application 408(1) to tenant-level virtual data center 406(1), that processing resources from each of hypervisors 206(1)-(5) have been allocated to tenant-level virtual data center 406(1) and may select, based on this determination, one or more of hypervisors 206(1)-(5) to which to expose backups of virtual machines 208(1) and 208(3).

In some examples after exposing a datastore containing backups of virtual machines to a hypervisor, exposing module 108 may assign the datastore to the virtual data center to which the virtual machines are to be restored so that the virtual machines can be restored to and made accessible via the virtual data center. For example after mounting datastore 222 that includes VM backup 224(1) of virtual machine 208(1) to hypervisor 206(1), exposing module 108 may assign datastore 222 to tenant-level virtual data center 406(1).

If the virtual data center is a tenant-level virtual data center, exposing module 108 may allocate the datastore to the virtual data center by first assigning the datastore to the provider-level virtual data center that hosts the tenant-level virtual data center and then by assigning the datastore to the tenant-level virtual data center. For example after mounting datastore 222 that includes VM backup 224(1) of virtual machine 208(1) to hypervisor 206(1), exposing module 108 may allocate datastore 222 to provider-level virtual data center 404 and/or tenant-level virtual data center 406(1).

At step 308, one or more of the systems described herein may regenerate the one or more virtual machines by accessing the backup of the one or more virtual machines at the backup storage. For example, at step 308 regenerating module 110 may, as part of computing device 202 in FIG. 2, regenerate virtual machine 208(1) from VM backup 224(1), virtual machine 208(2) from VM backup 224(2), and/or virtual machine 208(3) from VM backup 224(3). In another example, regenerating module 110 may regenerate one or more of virtual machines 208(1)-(3) from a backup stored within snapshot 218. The systems described herein may perform step 308 in any suitable manner. For example, regenerating module 110 may regenerate a virtual machine by simply creating an instance of a virtual machine that is defined by and configured to access the data (e.g., configuration files and virtual-disk files) stored within the backup of the virtual machine store within backup storage.

At step 310, one or more of the systems described herein may add the one or more virtual machines to the distributed application. For example, at step 310 adding module 112 may, as part of computing device 202 in FIG. 2, add virtual machines 208(1) and 208(3) to distributed application 408(1) and/or virtual machine 208(2) to distributed application 408(2).

The systems described herein may perform step 310 in any suitable manner. In one example if an instance of a distributed application already exists, adding module 112 may simply import virtual machines into the already existing distributed application. For example, adding module 112 may simply add virtual machine 208(2) to distributed application 408(2). On the other hand if an instance of a distributed application does not exist, adding module 112 may (1) create a new instance of the distributed application, (2) configure the new instance of the distributed application using configuration details of the distributed application (e.g., from a backup of the distributed application), and (3) import virtual machines to the new instance of the distributed application. For example, adding module 112 may add virtual machines 208(1) and 208(3) to distributed application 408(1) by (1) creating a new instance of distributed application 408(1), (2) configuring the new instance of distributed application 408(1) using configuration details of the distributed application (e.g., from DA backup 226), and (3) adding virtual machines 208(1) and 208(3) to distributed application 408(1).

In addition to adding virtual machines to a distributed application, adding module 112 may also configure the virtual machines according to the configuration details of the distributed application. For example, adding module 112 may configure network and storage access for each virtual machine of a distributed application according to the configuration details of the distributed application.

At step 312, one or more of the systems described herein may restore the distributed application by starting the one or more virtual machines as part of the distributed application before completely recovering the one or more virtual machines from the backup storage to the datastore of the virtual data center. For example, at step 312 restoring module 114 may, as part of computing device 202 in FIG. 2, restore distributed application 408(1) to tenant-level virtual data center 406(1) by starting virtual machines 208(1) and 208(3) as part of distributed application 408(1) before completely recovering virtual machines 208(1) and 208(3) from backup storage system 220 or snapshot 218 to datastore 214. In another example, restoring module 114 may restore distributed application 408(2) to tenant-level virtual data center 406(1) by starting virtual machine 208(2) as part of distributed application 408(2) before completely recovering virtual machine 208(2) from backup storage system 220 or snapshot 218 to datastore 214. Upon completion of step 312, exemplary method 300 in FIG. 3 may terminate.

The systems described herein may perform step 312 in any suitable manner. In one example, restoring module 114 may restore a distributed application by starting its virtual machines as part of the distributed application before or without attempting to recover the data that defines the virtual machines (e.g., the configuration files or virtual-disk files of the virtual machines) from backup storage to a datastore of the virtual data center to which the distributed application is restored. For example, restoring module 114 may restore distributed application 408(1) by starting virtual machines 208(1) and 208(3) as part of distributed application 408(1) while the data that defines virtual machines 208(1) and 208(3) remains stored in backup storage system 220.

In some examples, restoring module 114 may restart the virtual machines of a distributed application according to configuration details associated with the distributed application. For example if a distributed application's metadata indicates a boot order in which to start each of the distributed application's virtual machines, restoring module 114 may restore the distributed application by starting its virtual machines according to the boot order.

In some instances, performance of a distributed application and its virtual machines executing within a virtual data center may improve if the data that defines the distributed applications and its virtual machines is stored within and access via a production datastore of the virtual data center instead of via backup storage. In these instances, restoring module 114 may migrate virtual machines from backup storage to the datastore of the virtual data center by transferring the data that defines the virtual machines from backup storage to the production datastore of the virtual data center. For example, restoring module 114 may migrate virtual machines 208(1)-(3) from datastore 222 of backup storage system 220 to datastore 214 of production storage system 212.

In at least one example, restoring module 114 may transfer the data that defines a virtual machine from backup storage to a production datastore while the virtual machine remains running. In at least one example, restoring module 114 may migrate a virtual machine from backup storage to a datastore of a virtual data center using VMWARE's STORAGE VMOTION.

Once a virtual machine has been completely recovered from backup storage to a production datastore of a virtual data center, the datastore that provided access to the backup of the virtual machine may no longer be needed. Therefore, after completely recovering a virtual machine from backup storage to a production datastore of a virtual data center, restoring module 114 may remove the datastore that provided access to the backup of the virtual machine from the virtual data center and/or the provider-level virtual data center that hosts the virtual data center and/or may unmount the datastore from the hypervisor to which it was mounted.

In some situations, a distributed application may be restored for the purpose of accessing files stored within the distributed application. In these situations, upon restoring a distributed application but before recovering each of its virtual machines from backup storage, restoring module 114 may recover at least one file from a virtual machine by accessing the file while the file is stored within backup storage. By allowing individual files to be recovered from a virtual machine of a distributed application without having to completely recover the virtual machine from backup storage, restoring module 114 may eliminate a need to recover virtual machines from backup storage in file recovery scenarios.

As explained above, by restoring a distributed application to a virtual data center before the distributed application's virtual machines (e.g., the virtual machines' configuration files and virtual-disk files) have been completely recovered from backup storage to the virtual data center's production datastores, the systems and methods described herein may instantly restore all or a portion of the distributed application. For example, the systems and methods described herein may instantly restore a distributed application to a virtual data center by restoring each virtual machine within the distributed application from a backup of the virtual machine that is stored within backup storage, importing each virtual machine into the distributed application, and starting the virtual machines as part of starting the distributed application before migrating each virtual machine from the backup storage to the virtual data center's production datastores.

In another example, the systems and methods described herein may instantly recover a distributed-application stack (e.g., a VMWARE VAPP) from backup storage to a tenant-level virtual data center (e.g., a VMWARE ORGANIZATION VIRTUAL DATACENTER) by (1) using the definition of the tenant-level virtual data center to identify the provider-level virtual data center and/or the hypervisors (e.g., an VMWARE ESXI host) that provide resources to the tenant-level virtual data center, (2) using backed up metadata of the distributed-application stack to locate and mount backup images of each of the distributed-application stack's virtual machines to an identified hypervisor as a part of a datastore (e.g., a NFS or VMFS datastore), (3) recreating each of the distributed-application stack's virtual machines from the backup images stored within the mounted datastores, (4) adding the newly created datastores to a datastore resource pool of the tenant-level virtual data center and/or the provider-level virtual data center, (5) using backed up metadata of the distributed-application stack to recreate the distributed-application stack within the tenant-level virtual data center, (6) importing the virtual machines into the recreated distributed-application stack from the hypervisors to which they are located, (7) bringing the distributed-application stack up and running, and (8) moving the distributed-application stack and its virtual machines from backup storage to a production datastore of the tenant-level virtual data center (e.g., using VMWARE'S STORAGE VMOTION). In some examples once the distributed-application stack has been migrated from backup storage to the production datastore, the systems and methods described herein may remove the datastores that provided access the backups of the distributed-application stack's virtual machines from the tenant-level virtual data center and/or the provider-level virtual data center.

In some situations, a distributed-application stack may include two or more virtual machines that must be restored to separate hypervisors. In these situations, the systems and methods described herein may expose backup images of the two or more virtual machines to separate hypervisors using a separate datastore for each hypervisor.

In some examples instead of restoring a complete distributed-application stack from backup storage, the systems and methods described herein may restore a portion of a distributed-application stack from backup storage. For example, the systems and methods disclosed herein may partially restore an existing distributed-application stack by restoring one or more of the distributed application stack's virtual machines that have faulted and adding the one or more virtual machines to the already existing distributed-application stack.

In at least one example, the systems and methods described herein may restore all or a portion of a distributed-application stack to enable various services such as distributed-application stack testing and/or single-file restoration.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
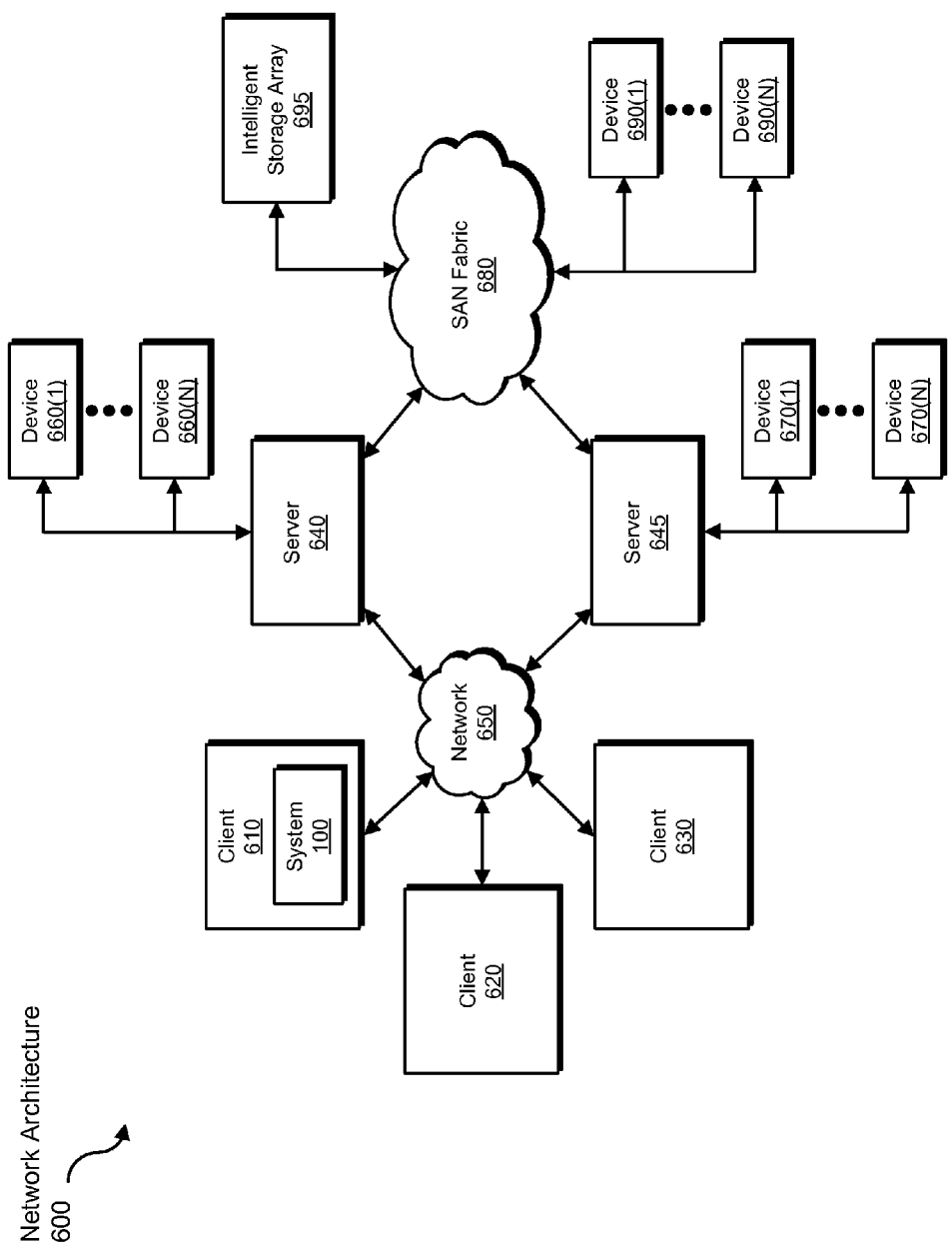
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for restoring distributed applications within virtual data centers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a failed distributed application to be transformed, transform the failed distributed application into a restored distributed application using data stored within backup storage, output a result of the transformation to a virtual data center that hosts distributed applications, use the result of the transformation to provide access to the distributed application, and store the result of the transformation to a datastore of the virtual data center. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for restoring distributed applications within virtual data centers, at least a portion of the method being performed by a computing device comprising at least one processor, the method comprising:
  receiving a request to restore a distributed application to a virtual data center, wherein:
    the distributed application comprises at least one virtual machine;
    the virtual data center comprises:
      at least one processing resource allocated from at least one hypervisor;
      at least one datastore for storing virtual machines running within the virtual data center;
  identifying a backup of the virtual machine stored within backup storage;
  exposing the backup of the virtual machine stored within the backup storage to the hypervisor;
  regenerating the virtual machine by accessing the backup of the virtual machine at the backup storage;
  adding the virtual machine to the distributed application;
  restoring, before completely recovering the virtual machine from the backup storage to the datastore of the virtual data center, the distributed application by starting the virtual machine as part of the distributed application.

2. The computer-implemented method of claim 1, further comprising recovering the virtual machine from the backup storage to the datastore of the virtual data center by migrating the virtual machine from the backup storage to the datastore of the virtual data center.

3. The computer-implemented method of claim 1, further comprising:
  determining, in response to receiving the request to restore the distributed application to the virtual data center, that the processing resource from the hypervisor is capable of being allocated to the virtual data center;
  selecting, based at least in part on determining that the processing resource from the hypervisor is capable of being allocated to the virtual data center, the hypervisor on which to start the virtual machine.

4. The computer-implemented method of claim 3, wherein:
  the virtual data center comprises a tenant-level virtual data center;
  determining that the processing resource from the hypervisor is capable of being allocated to the virtual data center comprises:
    identifying a provider-level virtual data center that hosts the tenant-level virtual data center;
    determining that the processing resource is allocated to the provider-level virtual data center.

5. The computer-implemented method of claim 1, wherein exposing the backup of the virtual machine stored within the backup storage to the hypervisor comprises mounting the backup of the virtual machine stored within the backup storage to the hypervisor as part of an additional datastore.

6. The computer-implemented method of claim 5, wherein the additional datastore comprises at least one of:
  a network-file-system datastore;
  a virtual-machine-file-system datastore.

7. The computer-implemented method of claim 5, further comprising allocating the additional datastore to at least one of:
  the virtual data center;
  a provider-level virtual data center that hosts the virtual data center.

8. The computer-implemented method of claim 1, wherein identifying the backup of the virtual machine stored within the backup storage comprises:
  identifying configuration details of the distributed application;
  determining, based at least in part on the configuration details of the distributed application, that the distributed application comprises the virtual machine;
  determining that the virtual machine has been backed up to the backup storage.

9. The computer-implemented method of claim 1, wherein:
  the request to restore the distributed application to a virtual data center comprises a request to completely restore the distributed application;
  adding the virtual machine to the distributed application comprises regenerating the distributed application.

10. The computer-implemented method of claim 1, wherein the request to restore the distributed application to the virtual data center comprises a request to restore the virtual machine to the distributed application.

11. The computer-implemented method of claim 1, wherein restoring the distributed application by starting the virtual machine as part of the distributed application comprises starting the distributed application before completely recovering the virtual machine from the backup storage to the datastore of the virtual data center.

12. The computer-implemented method of claim 1, wherein:
  the distributed application comprises:
    a plurality of virtual machines;
    configuration details that indicate a boot order in which to start each virtual machine within the plurality of virtual machines;
  restoring the distributed application by starting the virtual machine as part of the distributed application comprises starting, before completely recovering each virtual machine within the plurality of virtual machines from the backup storage to the datastore of the virtual data center, each virtual machine within the plurality of virtual machines according to the boot order.

13. The computer-implemented method of claim 1, further comprising backing up the distributed application by:
  backing up the virtual machine to the backup storage;
  backing up configuration details of the distributed application to the backup storage.

14. The computer-implemented method of claim 1, wherein the backup of the virtual machine comprises a snapshot of the datastore.

15. The computer-implemented method of claim 1, wherein the distributed application comprises a multi-tiered application.

16. The computer-implemented method of claim 1, wherein the distributed application comprises a logical entity for independently managing at least one of:
  a processing resource allocated to the distributed application;
  a storage resource allocated to the distributed application;
  a network resource allocated to the distributed application;
  the virtual machine.

17. The computer-implemented method of claim 1, wherein the distributed application comprises two or more virtual machines.

18. The computer-implemented method of claim 1, further comprising recovering at least one file from the virtual machine before completely recovering the virtual machine from the backup storage to the datastore of the virtual data center.

19. A system for restoring distributed applications within virtual data centers, the system comprising:
  a receiving module that receives a request to restore a distributed application to a virtual data center, wherein:
    the distributed application comprises at least one virtual machine;
    the virtual data center comprises:
      at least one processing resource allocated from at least one hypervisor;
      at least one datastore for storing virtual machines running within the virtual data center;
  an identifying module that identifies a backup of the virtual machine stored within backup storage;
  an exposing module that exposes the backup of the virtual machine stored within the backup storage to the hypervisor;
  a regenerating module that regenerates the virtual machine by accessing the backup of the virtual machine at the backup storage;
  an adding module that adds the virtual machine to the distributed application;
  a restoring module that restores, before completely recovering the virtual machine from the backup storage to the datastore of the virtual data center, the distributed application by starting the virtual machine as part of the distributed application;
  at least one processor that executes the receiving module, the identifying module, the exposing module, the regenerating module, the adding module, and the restoring module.

20. A non-transitory computer-readable medium comprising one or more computer-executable instructions that, when executed by at least one processor of a computing device, cause the computing device to:
    receive a request to restore a distributed application to a virtual data center, wherein:
        the distributed application comprises at least one virtual machine;
        the virtual data center comprises:
            at least one processing resource allocated from at least one hypervisor;
            at least one datastore for storing virtual machines running within the virtual data center;
    identify a backup of the virtual machine stored within backup storage;
    expose the backup of the virtual machine stored within the backup storage to the hypervisor;
    regenerate the virtual machine by accessing the backup of the virtual machine at the backup storage;
    add the virtual machine to the distributed application;
    restore, before completely recovering the virtual machine from the backup storage to the datastore of the virtual data center, the distributed application by starting the virtual machine as part of the distributed application.

\* \* \* \* \*